April 20, 1948.  R. H. NISBET  2,440,183
AUTOMATIC REGULATING SYSTEM HAVING A MOVABLE
CONTROL ELEMENT AND A FOLLOW-UP ELEMENT
Filed Feb. 19, 1944
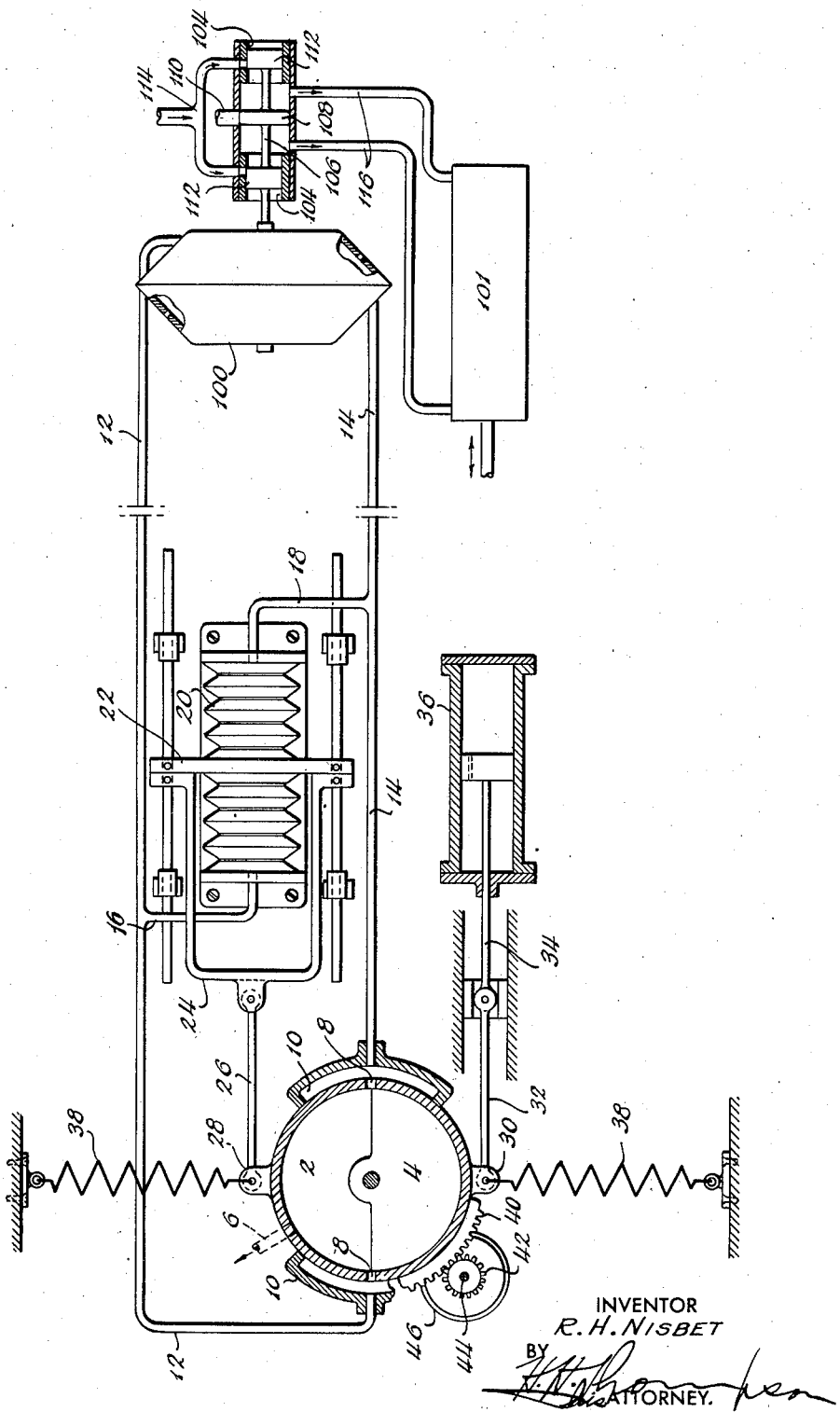
INVENTOR
R. H. NISBET
BY
ATTORNEY.

Patented Apr. 20, 1948

2,440,183

UNITED STATES PATENT OFFICE 2,440,183

AUTOMATIC REGULATING SYSTEM HAVING A MOVABLE CONTROL ELEMENT AND A FOLLOW-UP ELEMENT

Robert Hayes Nisbet, Stroud, England, assignor to The Sperry Gyroscope Company, Ltd., Brentford, England Application February 19, 1944, Serial No. 523,099
In Great Britain February 3, 1943

Section 1, Public Law 690, August 8, 1946
Patent expires February 3, 1963

9 Claims. (Cl. 121—41)

This invention relates to automatic regulating systems of the type in which the application of power to a power-operated part to be controlled is regulated by the relative movement between a primary control member and a co-operating member which undergoes a "restoring" or "follow-up" or "repeat-back" movement dependent upon the operation of the power-operated part or of the means that actuates it, the arrangement being such that the power supplied to the power-operated part is automatically regulated in such a way as to cause the said co-operating member to move in a direction to restore it and the primary control member into alignment, i. e., into their initial or normal relative positions.

This so-called restoring action is well known and has often been employed to regulate the movement of a power-operated part in strict proportion to the movement of a control member.

In many automatic regulating systems, e. g., those for regulating the course or attitude of aircraft, however, it is known that it is advantageous to ensure that movements of the power-operated part should depend at every instant not only upon the displacement of the primary control member but also upon one or more time derivatives of such displacement.

One of the various objects of the present invention is to provide an improved arrangement adapted to fulfil this requirement in a simple way, and in which control of the means that actuates the power-operated part is effected from the primary control member and the member or members that co-operate therewith by means of a single control signal transmitted therebetween.

The invention consists in an automatic regulating system of the type referred to wherein the power applied to the power-operated part to be controlled is regulated in dependence upon a force which is determined by the relative movement between the primary control member and the cooperating member and which force is applied to the cooperating member to bring about the restoring movement thereof, and wherein the movement of the said member under that force is resisted by means adapted to generate counter-forces opposing the movement of the member, the said counter-forces including a force dependent upon the movement of the member and also an additional force or forces dependent upon one or more time derivatives of the movement.

According to one form of the invention, in which fluid pressure is employed to actuate the controlled part, the primary control member is arranged by its movement relative to the said co-operating member to cover and uncover ports controlling the flow of fluid and therefore to alter a pressure-difference which is transmitted to a power-operated device that effects the operation of the part to be controlled. In this form of the invention, the force necessary to produce the restoring movement against the action of the means which generates the counter-forces is produced by a fluid-pressure motor device, mechanically coupled to the said co-operating member to cause it to undergo the restoring movement and subject to the pressure-difference transmitted to the said device.

The means for generating a counter-force dependent upon the movement of the said co-operating member may consist of a control spring which generates a force directly proportional to the amplitude of the repeat-back movement. The counter-forces dependent upon time derivatives of the movement of the member may be a dash-pot device generating a force proportional to the first time derivative (i. e., velocity) and a flywheel or other mass generating a force proportional to the second time derivative (i. e., acceleration).

Other features of the invention will appear from the following description with reference to the accompanying drawing and are particularly pointed out in the appended claims.

The accompanying drawing is a diagrammatic arrangement of the mechanism of a system according to the invention for controlling the course of an aircraft or its attitude about an axis.

In the arrangement shown in the drawing, the member which undergoes the restoring movement consists of a rotatable chamber 2 and the primary control member with which it co-operates consists of a part 4 mounted within the chamber 2 and adapted to rotate independently of the chamber 2 but coaxially therewith. A primary supervising instrument in the form of a gyroscope (not shown) maintains the member in a fixed angular position about an axis so that the angular displacement of the member relative to the aircraft constitutes a measure of the deviation of the craft from a set course or attitude. The part 2, which may be called a "pick-off" member is formed with two ports 8 arranged so that when the control member is in a certain or "neutral" position relative to the pick-off member the two ports 8 are equally partly obscured. When the control member is moved relative to the pick-off member, the effective opening of one of the ports 8 is reduced and at the same time the effective opening of the other port is increased.

Each of the ports 8 is in permanent communication with a relatively stationary chamber 10 and the two chambers 10 are connected respectively with pipe lines 12 and 14.

A suction pipe 6 opens into the pick-off member 2 so that a continuous stream of air is drawn through the pipe lines 12 and 14. The suction in these two pipe lines is equal when the control member 4 is in the neutral position relative to the pick-off member 2, that is, when both ports 8 are equally partly obscured. On movement of the control member so that one of the ports 8 becomes obscured to a greater extent than the other, the flow through one of these ports is reduced relatively to the other so that a difference of pressure occurs between the two pipe lines 12 and 14, the sense of this pressure difference being determined by the direction of rotation of the control member 4 relative to the pick-off member 2.

The pipe lines 12 and 14 may be connected directly to a pneumatic servo-motor adapted to move the power-operated part under control to a position which depends upon the difference of pressure between the two pipe lines 12 and 14. In the arrangement shown, however, the pipe lines 12 and 14 lead to a diaphragm 100 controlling an unbalanced relay valve 102 which in turn controls the operation of a hydraulic servo-motor 101 adapted to actuate the part under control (not shown). While the relay valve 102 may be of any known type arranged so that the hydraulic pressure difference acting on the piston of the servo and therefore the displacement of the part under control depends both for direction and magnitude upon the difference of pressure between the pipe lines 12 and 14, the relay valve 102 may conveniently comprise a cylinder having end portions 104, 104 of reduced cross-sectional area. The piston valve itself comprises a stem 106 having three piston heads thereon. The central piston head 108, which is located in the larger central portion of the cylinder, co-operates with an exhaust pipe 110 leading to a reservoir of the hydraulic fluid. The remaining piston heads 112 are located respectively in the end portions 104 of the cylinder and each co-operates with an inlet pipe 114. Pipes 116 leading to opposite sides of the servo-motor 101 lead from the central portion of the cylinder and have the central piston head 108 located therebetween. In the operation of this relay valve with movement of the stem 106 to the right as shown in the drawing, pressure will be built up on the right hand side of the servo-motor, whilst the left hand side of the servo-motor will be opened to exhaust by reason of movement of the central piston head 108 to the right away from the exhaust pipe 110. The pressure fluid in the space between the piston head 108 and the right hand piston head 112 will however, by exerting pressure against the right hand face of the central piston head 108, eventually balance the force, in the opposite direction, exerted on the stem 106 by the diaphragm 100 so that movement of the piston valve will be halted; it will thus be realised that the extent of movement of the piston valve will therefore be governed by the pressure difference in the pipes 12 and 14. It is to be noted that the piston heads 112 are of sufficient width relatively to the cross-sectional size of the pipes 114 and are so arranged with relation thereto that in movements of the piston valve, pressure fluid will not find its way to the back of the piston heads 112, 112.

The pipe lines 12 and 14 are connected respectively by auxiliary pipe lines 16 and 18 to opposite end portions of a fluid-pressure motor device in the form of a double acting bellows device 20. The bellows device actuates a slidable plate or frame 22 which is connected by a yoke member 24 and connecting rod 26 to a lug 28 on the pick-off member 2.

The movements of the pick-off member under the forces applied by the bellows device are resisted by means of control springs 38. The springs 38 are under tension so that movement of the pick-off member in either direction causes the springs 38 to apply a restoring torque proportional to the movement of the pick-off member.

The pick-off member is also coupled by means of a connecting rod 32 to the piston rod 34 of a double-acting dashpot device 36.

Secured to the exterior of the member 2 is a toothed sector 40 meshing with a pinion 42 secured to a shaft 44 upon which a light fly-wheel 46 is also secured.

As previously indicated, a primary supervising instrument in the form of a gyroscope (not shown) maintains the member 4 in a fixed angular position about an axis, so that angular displacement of the member relative to the aircraft constitutes a measure of the deviation of the craft from the set course or attitude. The servo-motor 101 is arranged to actuate a suitable control surface (not shown) of the aircraft for the purpose of correcting the deviations from set course or attitude to which the member 4 is sensitive.

When the aircraft deviates from the set course or attitude, the resulting relative movement of the member 4 with respect to the pick-off member 2 upsets the balance between the two ports 8 so that a difference of pressure occurs between the two pipe-lines 12 and 14. The relay valve 102 responds to this pressure-difference and causes the servo-motor to actuate the control surface in the direction appropriate for correcting the deviation.

The difference of pressure which occurs between the two pipe-lines 12 and 14 also acts on the bellows device 20 so that a force is applied through the connecting rod 26 to cause a torque to be applied to the pick-off member about its axis and this torque causes the pick-off member to be moved in the direction appropriate to nullify the relative movement between the members 4 and 2 which initiated the control action of the system. The pick-off member 2 thus tends to maintain alignment with the primary control member 4.

This restoring movement of the member 2 is opposed by three counter-forces or torques, namely, (i) that due to the reaction of the springs 38, (ii) that due to the reaction of the dash-pot 36, and (iii) that due to the inertia of the wheel 46. The member 2 must therefore adjust itself so that the pressure difference in the pipe lines 12 and 14 acting on the bellows device 20 produces a force just sufficient to counterbalance the forces (i), (ii) and (iii). As previously indicated, the movement of the power-operated part under control is proportional to the pressure difference in the pipe lines 12 and 14. It follows therefore that the movement of the part under control is proportional at every instant to the algebraic sum of three forces one of which is proportional to the amplitude of the "repeat back" movement whilst the other two are proportional to the first and second time derivatives thereof. Thus the correcting action applied by the control surface will depend not only upon the amplitude of any deviation from set course or attitude, but upon the rate of change of this deviation and also upon the rate at which the said rate of change is increasing or diminishing at any instant, i. e., on the displacement and on the first and second derivatives of this displacement with respect to time.

It is well known that a control system having a relationship of this kind between deviations from set course or attitude and the correcting action of the control surface is capable of providing sensitive and accurate control such as will markedly assist in eliminating hunting.

It is desirable, to achieve the best results, to arrange that the total force opposing the displacement of the pick-off member 2, during a displacement of the maximum magnitude and occurring at the maximum rate and acceleration that are liable to occur in operation, should not exceed the pressure difference that the pick-off can provide at small relative displacement of the gyroscope and pick-off. For this purpose the tension of the springs 38, the drag resistance of the dash-pot 36 and the inertia of the fly-wheel 46 are kept low and the pick-off is designed (the members 2 and 4 being of relatively large dimensions) to have a sharply rising output for an initial small relative displacement between the members 2 and 4. Also a sufficient volume of air must flow in the pick-off air stream to supply the bellows device 20 with air fast enough to enable it to keep the pick-off member 2 moving closely in step with the member 4 while yet maintaining an adequate pressure difference. The system may thus be designed to secure close following of the primary control member 4 by the pick-off 2 so that the repeat-back movement of the member 2 is very nearly an exact measure of the movement of the primary control element. It should be appreciated, however, that even if these requirements are only approximately fulfilled, the apparatus will operate approximately in the manner indicated herein and will ensure good control characteristics and prevent or substantially prevent hunting of the aircraft under automatic control.

It will be immediately apparent from the foregoing description of my invention that other types of coupling or control devices, for example electrical, may be employed instead of the particular pneumatic-hydraulic coupling hereinbefore described in detail, the mechanical coupling devices having been included herein merely as an example. Thus, the above described apparatus should be viewed as exemplary of the invention only and in no way a limitation on the scope thereof.

It should be noted that the method of obtaining derivatives for control purposes according to the invention generates both the displacement, or departure, term and the derivative terms as terms present in the output of the pick-off for the primary supervising instrument. This output is usually in the form of a pressure difference or of an electrical voltage or current and it is therefore suitable for being led directly to a remotely situated relay—either the servo-motor relay or an intermediate relay or amplifier for actuating the servo-motor relay. Thus mechanical connections between the primary supervising instrument and/or the pick-off associated with it on the one hand, and the relay it serves to control on the other hand, can be dispensed with. Moreover, as the restoring action consists in the application to the pick-off of a force, rather than in the application of a precisely determined movement, the difficulties associated with cable or like mechanical restoring connections, or with the use of electrical position-restoring systems for this purpose, are avoided, and it is possible to employ simple arrangements in which the restoring connections are constituted by a pair of pressure lines or by a pair of electrical conductors.

I claim:

1. An automatic regulating system having a movable control element and a following element, means for exerting a force on said following element dependent on the relative displacement of said elements and means connected to said following element for generating counter-forces to oppose the movement thereof, said last-named means including a control spring generating a force directly proportional to the amplitude of the displacement, and means for creating a force varying as the first time derivative of the displacement.

2. An automatic regulating system having a movable control element and a following element, means for exerting a force on said following element dependent on the relative displacement of said elements and means connected to said following element for generating counter-forces to oppose the movement thereof, said last-named means including a control spring generating a force directly proportional to the amplitude of the displacement, means for creating a force varying as the first time derivative of the displacement, and means for creating a force varying as the second time derivative of the displacement.

3. An automatic regulating system having a movable control element and a follow-up element, means for exerting a force on said follow-up element dependent on a displacement of said controlled element, and means connected to said follow-up element for generating counter-forces to oppose the movement thereof which include a control spring generating a force directly proportional to the amplitude of the displacement, a dash-pot device creating a force dependent on the first time derivative of said displacement and a rotatable inertia device generating a force which is a function of the second time derivative of the said displacement.

4. An automatic regulating system as claimed in claim 3, in which said rotatable inertia device comprises a fly wheel, and a gear mechanism mounting said fly wheel on said follow-up element.

5. In an automatic regulating system, a fluid pressure pick-off means including a control member, a ported housing member, the former of which is responsive to changes in a condition, and means pivotally connecting said members and enabling said former member to control the effective aperture of the ports, a fluid pressure relay valve connected to the ports, a fluid pressure motor device responsive to the effective pressure supplied to the relay, means coupling said device to said housing to produce a restoring movement therein, yielding means mounted on said housing adapted to generate and apply a counter-force proportional to said restoring movement, and means for generating and applying a counter-force proportional to the first derivative of said movement.

6. In an automatic regulating system, a fluid pressure pick-off means including a control member, a ported housing member, the former of which is responsive to changes in a condition, and means pivotally connecting said members and enabling said former member to control the effective aperture of the ports, a fluid pressure relay valve connected to the ports, a fluid pressure motor device responsive to the effective pressure supplied to the relay, means coupling said device to said housing to produce a restoring movement therein, yielding means mounted on said housing adapted to generate and apply a counter-force proportional to said restoring movement, means for generating and applying a counter-force proportional to the first derivative of said movement, and means for generating and applying a counter-force proportional to the second derivative of said movement.

7. In an automatic regulating system, a fluid pressure pick-off means including a control member, a ported housing member, the former of which is responsive to changes in a condition, and means pivotally connecting said members and enabling said former member to control the effective aperture of the ports, a fluid pressure relay valve connected to the ports, a double acting bellows device responsive to the effective pressure supplied to the relay, means coupling said device to said housing to produce a restoring movement therein, a control spring mounted on said housing adapted to generate and apply a counter-force proportional to the amplitude of the restoring movement, and means for generating and applying a counter-force proportional to the first derivative of the movement.

8. In an automatic regulating system, a fluid pressure pick-off means including a control member, a ported housing member, the former of which is responsive to changes in a condition, and means pivotally connecting said members and enabling said former member to control the effective aperture of the ports, a fluid pressure relay valve connected to the ports, a double acting bellows device responsive to the effective pressure supplied to the relay, means coupling said device to said housing to produce a restoring movement therein, a control spring mounted on said housing adapted to generate and apply a counter-force proportional to the amplitude of the restoring movement, means for generating and applying a counter-force proportional to the first derivative of the movement, and means for generating and applying a counter-force proportional to the second derivative of the movement.

9. In an automatic regulating system, a fluid pressure pick-off means including a control member, a ported housing member, the former of which is responsive to changes in a condition, and means pivotally connecting said members and enabling said former member to control the effective aperture of said ports, a fluid pressure relay valve connected to the ports, and a delayed action differential pressure device responsive to the effective pressure supplied to the relay, means coupling said device to said housing to produce a restoring movement therein, control spring means mounted on said housing adapted to generate and apply a counter-force proportional to said restoring movement, a dash-pot device connected to said housing adapted to generate and apply counter-forces proportional to the first derivative of the said movement.

ROBERT HAYES NISBET.

REFERENCES CITED

The following references are of record in the file of this patent:

UNITED STATES PATENTS

| Number | Name | Date |
| --- | --- | --- |
| 2,020,847 | Mitereff | Nov. 12, 1935 |
| 2,100,934 | Berges | Nov. 30, 1937 |
| 2,210,916 | Kenyon | Aug. 13, 1940 |
| 2,306,346 | Rockwell | Dec. 22, 1942 |
| 2,312,464 | Ziebolz | Mar. 2, 1943 |
| 2,368,628 | Bates | Feb. 6, 1945 |
| 2,390,119 | Nisbet | Dec. 4, 1945 |

FOREIGN PATENTS

| Number | Country | Date |
| --- | --- | --- |
| 668,388 | France | July 9, 1929 |